United States Patent
Schick et al.

(10) Patent No.: US 10,328,912 B2
(45) Date of Patent: *Jun. 25, 2019

(54) PNEUMATIC TRAILER BRAKE CIRCUIT WITH BREAKAWAY DETECTION AND METHOD THEREOF

(71) Applicant: Deere & Company, Moline, IL (US)

(72) Inventors: Troy E. Schick, Cedar Falls, IA (US); Brandon J. McMillen, Cedar Falls, IA (US); Jordan Tagtow, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/222,075

(22) Filed: Jul. 28, 2016

(65) Prior Publication Data
US 2018/0029570 A1 Feb. 1, 2018

(51) Int. Cl.
*B60T 8/17* (2006.01)
*B60T 13/58* (2006.01)
(Continued)

(52) U.S. Cl.
CPC .......... *B60T 8/1708* (2013.01); *B60T 13/581* (2013.01); *B60T 15/027* (2013.01); *B60T 15/028* (2013.01);
(Continued)

(58) Field of Classification Search
CPC ...... B60T 8/1708; B60T 8/171; B60T 11/108; B60T 13/581; B60T 15/027; B60T 15/028
(Continued)

(56) References Cited

U.S. PATENT DOCUMENTS

| 2,575,099 A | 4/1954 | Troy |
| 6,206,481 B1 * | 3/2001 | Kaisers ................... B60T 8/327 303/118.1 |

(Continued)

FOREIGN PATENT DOCUMENTS

| DE | 1995579 A1 * | 5/2001 |
| DE | 19955797 * | 5/2001 |

(Continued)

OTHER PUBLICATIONS

European Patent Office. Extended European Search Report and Written Opinion issued in Application No. 17178854.0, dated Dec. 7, 2017, 9 Pages.

*Primary Examiner* — Robert A. Siconolfi
*Assistant Examiner* — San M Aung
(74) *Attorney, Agent, or Firm* — Taft Stettinius & Hollister LLP; Stephen F. Rost

(57) ABSTRACT

A method of detecting a leak in an air trailer brake circuit of a trailer includes providing a controller, a base valve, a first sensor, a second sensor, a leak control valve having a solenoid, a pneumatic fluid supply, a first brake output, and a second brake output. The method further includes supplying a first pressure to an inlet of the base valve and outputting a second pressure from an outlet of the base valve. The first pressure is detected with the first sensor and the second pressure is detected with the second sensor. The method also includes communicating the detected first pressure and the second pressure to the controller, and comparing a difference between first pressure and the second pressure to a threshold. A leak is detected in the air trailer brake circuit if the difference satisfies the threshold.

20 Claims, 5 Drawing Sheets

(51) Int. Cl.
*B60T 15/02* (2006.01)
*B60T 17/22* (2006.01)

(52) U.S. Cl.
CPC .......... *B60T 17/221* (2013.01); *B60T 17/226* (2013.01); *B60T 2270/403* (2013.01)

(58) Field of Classification Search
USPC ................................. 303/2, 9.61, 9.63, 9.66
See application file for complete search history.

(56) References Cited

U.S. PATENT DOCUMENTS

| | | |
|---|---|---|
| 8,974,011 B2 | 3/2015 | Schick et al. |
| 2015/0239441 A1* | 8/2015 | Klostermann ........ B60T 8/1708 303/7 |
| 2015/0344011 A1* | 12/2015 | Casali ....................... B60T 7/04 303/7 |

FOREIGN PATENT DOCUMENTS

| | | | |
|---|---|---|---|
| DE | 102008009043 | * | 5/2009 |
| EP | 2631131 A2 | | 8/2013 |
| WO | 2007135160 A1 | | 11/2007 |

* cited by examiner

PNEUMATIC TRAILER BRAKE CIRCUIT WITH BREAKAWAY DETECTION AND METHOD THEREOF

FIELD OF THE DISCLOSURE

The present disclosure relates to a pneumatic trailer brake control circuit, and in particular, to a pneumatic brake control circuit with breakaway detection.

BACKGROUND OF THE DISCLOSURE

Tractor trailer combinations generally require a braking system on the trailer that is engaged when a braking system of the tractor is selectively engaged. Often the braking system of the trailer is coupled to the braking system of the tractor to allow the tractor to simultaneously apply the braking system of the tractor and the trailer. Conventional on-road trucks with pneumatic or air service brakes utilize a mechanical breakaway valve since the same operating pressures are used for air service brake and air trailer brake systems. On an agricultural tractor or work machine, however, the service brakes are hydraulic which utilize a much greater operating pressure than a pneumatic or air brake system.

SUMMARY

In one embodiment of the present disclosure, a method of detecting a leak in an air trailer brake circuit of a trailer includes providing a controller, a base valve, a first sensor, a second sensor, a leak control valve having a solenoid, a pneumatic fluid supply, a first brake output, and a second brake output; supplying a first pressure to an inlet of the base valve, where the first pressure is a hydraulic pressure; outputting a second pressure from an outlet of the base valve, where the second pressure is a pneumatic pressure; detecting the first pressure with the first sensor and the second pressure with the second sensor; communicating the detected first pressure and the second pressure to the controller; comparing a difference between first pressure and the second pressure to a threshold; and detecting a leak in the air trailer brake circuit if the difference satisfies the threshold.

In one example of this embodiment, the method may include energizing the solenoid of the leak detect valve via the controller if the difference satisfies the threshold. In a second example, the method may include actuating the leak detect valve to a closed position if the difference satisfies the threshold. In a third example, the method may include supplying pressurized fluid from the pneumatic fluid supply to the leak control valve. In a fourth example, the method may include supplying a third pressure to a second inlet of the base valve from the pneumatic fluid supply, where the third pressure is a pneumatic pressure. In a fifth example, the method may include determining the difference by first multiplying the first pressure by a ratio, and then subtracting the second pressure therefrom.

In a sixth example of the embodiment, the method may include de-energizing the solenoid if the difference does not satisfy the threshold. Moreover, the method may include fluidly coupling the pneumatic fluid supply to the first and second brake outlet if the leak detect valve is de-energized. In another example, the method may include blocking pneumatic fluid from the first and second brake outlets when the difference satisfies the threshold. In yet another example, the method may include releasing a park brake of the trailer if the difference satisfies the threshold. In a further example, the method may include disengaging the park brake of the trailer if the difference does not satisfy the threshold.

In yet a further example, the method may include fluidly coupling the leak detect valve and the base valve in series when the difference does not satisfy the threshold. The method may also include fluidly coupling the pneumatic fluid supply to the first brake output via the leak detect valve; and fluidly coupling the pneumatic fluid supply to the second brake output via the leak detect valve and the base valve. Moreover, the method may include stopping the detected leak between the base valve and the second brake output by energizing the solenoid of the leak detect valve.

In another example of this disclosure, a braking system of a trailer includes a pressurized supply of pneumatic fluid and hydraulic fluid; a base valve including an inlet and an outlet, where the inlet is fluidly coupled to the pressurized supply of hydraulic fluid; a solenoid control valve including an inlet fluidly coupled to the pressurized supply of pneumatic fluid, the solenoid control valve operably controlled between an energized state and a de-energized state; a brake output fluidly coupled to the outlet of the base valve; a first sensor and a second sensor fluidly coupled to the base valve, the first sensor configured to detect a first pressure at the inlet of the base valve, and the second sensor configured to detect a second pressure at the outlet of the base valve; wherein, the solenoid valve is operably controlled to its energized state when a difference between the first pressure and second pressure satisfies a threshold.

In one example of this embodiment, in the de-energized state the pressurized supply is fluidly coupled to the base valve and the brake output, and in the energized state the solenoid control valve fluidly de-couples the pressurized supply from the base valve and the brake output. In a second example, the system may include a second brake output fluidly coupled to the solenoid control valve in the de-energized state. In a third example, the system may include a park brake pneumatically controlled by the second brake output between a disengaged position and an engaged position, wherein in the de-energized state the park brake is in its disengaged position, and in the energized state the park brake is in its engaged position.

In another example of this embodiment, the system may include a controller disposed in electrical communication with the first sensor, the second sensor, and the solenoid, the controller storing the threshold and a ratio, where the ratio is a function of the base valve; wherein, the controller determines the difference by multiplying the first pressure by the ratio and then subtracting the second pressure therefrom; wherein, the controller compares the difference to the threshold, and sends an electrical signal to the solenoid to control the solenoid valve between its energized and de-energized states.

In a further embodiment of this disclosure, a pneumatic braking system of a trailer towed by a work machine includes a pressurized supply providing pneumatic fluid; a pilot line providing hydraulic fluid; a base valve including a first inlet, a second inlet, and an outlet, where the first inlet is fluidly coupled to the pilot line; a solenoid control valve including an inlet and an outlet, the inlet of the solenoid control valve fluidly coupled to the pressurized fluid supply, and the outlet being coupled to the second inlet of the base valve; a first control line fluidly coupled to the outlet of the base valve; a second control line fluidly coupled to the outlet of the solenoid control valve; wherein, the solenoid control valve is operably controlled between an energized state and a de-energized state; wherein, in the de-energized state the pressurized supply is fluidly coupled to the second inlet of the base valve and the second control line, and in the energized state the solenoid control valve fluidly de-couples the pressurized supply from the second inlet of the base valve and the second control line.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
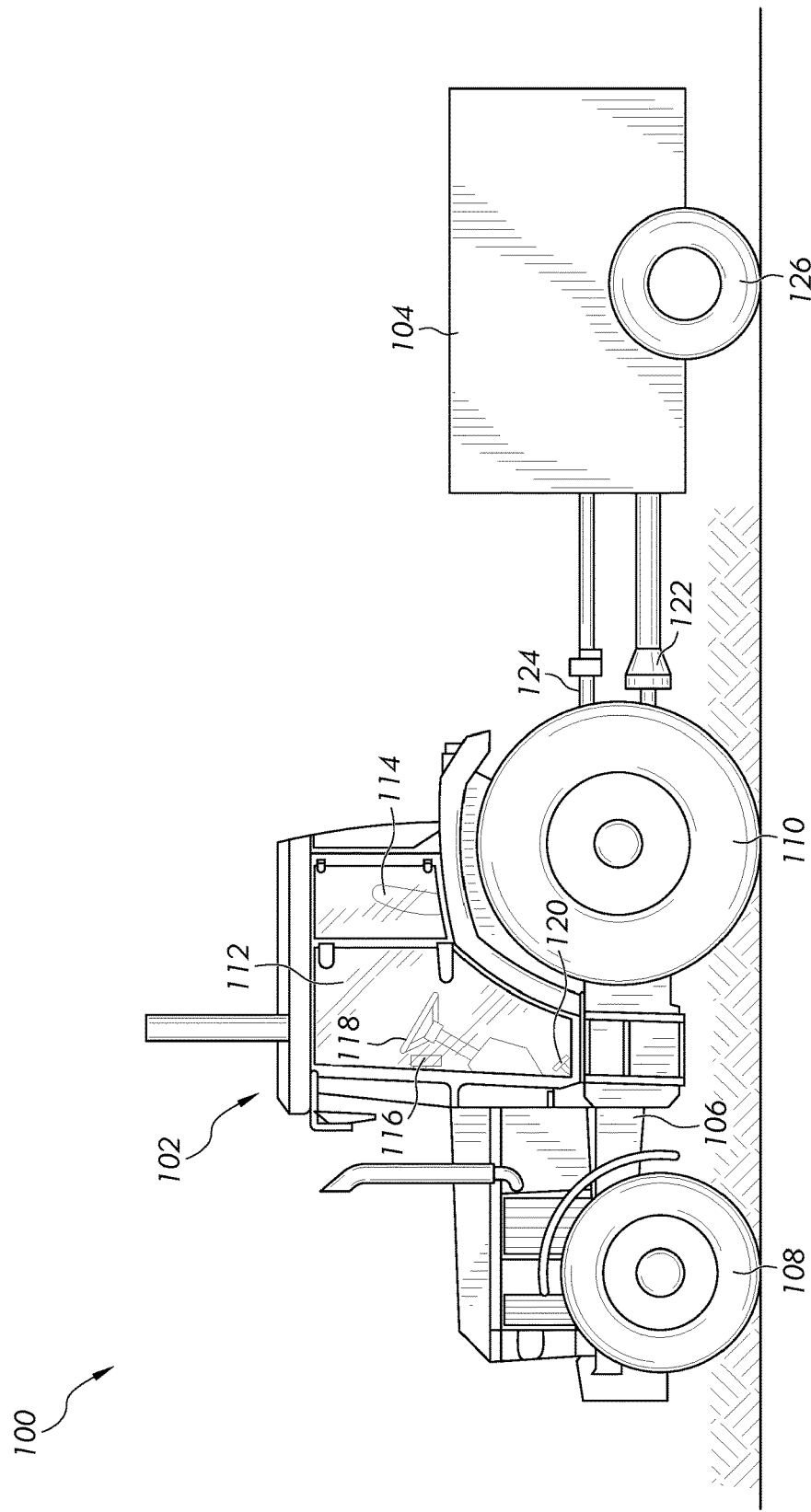
FIG. 1 is a side view of a combined tractor and trailer system.

Referring to FIG. 1, a combined tractor trailer system 100 is shown. In this system, a tractor 102 is shown coupled to and pulling a trailer 104. The tractor 102 may have a chassis 106 that spans between a front ground engaging mechanisms 108 and a rear ground engaging mechanisms 110. In the embodiment of FIG. 1, each ground-engaging mechanism is in the form of a wheel defined along a respective axle, i.e., a front axle and a rear axle. In other embodiments, however, the ground-engaging mechanism may be a track that propels the tractor 102 along a ground surface. Likewise, the trailer 104 may also include at least one ground-engaging mechanism such as a wheel 126.

A cab 112 may be coupled to the chassis 106 and define a location for an operator to be positioned in an operator's seat 114. From the cab, the operator may control the tractor 102 and trailer 104 via a plurality of controls. As shown, the cab 112 may include a display 116 or dashboard that visually shows control characteristics of the tractor 102 or trailer 104 such as speed, power, temperature, pressure, direction, and any other type of control characteristic. The display 116 may be a touchscreen display that includes one or more operator controls for selectively controlling the operation of the tractor 102 or trailer 104. Other controls may include a steering wheel or yoke 118, a pedal 120 (e.g., a brake pedal, clutch pedal, or throttle pedal), any other type of control such as a joystick, switch, lever, knob, etc. for controlling the tractor trailer system 100.

While a tractor 102 is shown and described herein, any type of work machine may utilize the teachings of this disclosure and therefore it is not intended to be limited to applying to only tractors. In other embodiments, a truck configured to tow a trailer may utilize the teachings of this disclosure. Accordingly, the tractor 102 can be any type of work machine used to pull a trailer.

The tractor 102 may be coupled to the trailer 104 through a hitch member or drawbar 116. The hitch member or drawbar 122 may be sufficiently strong to transfer motion of the tractor 102 to the trailer 104. In one embodiment, when the tractor 102 travels in a forward direction, the hitch member 122 pulls the trailer 104 along therewith in approximately the same direction.

One or more fluid lines 124 may also be provided. For purposes of this disclosure, a fluid may include a gas or liquid. Thus, any pneumatic or hydraulic line may be referred to as a fluid line herein. The one or more fluid lines 124 may selectively fluidly couple a tractor brake system to a trailer brake system. More specifically, the tractor 102 may provide a trailer brake output that is coupled to the trailer brake system. In this configuration, when the user initiates a brake command, both the tractor brake system and the trailer brake system may simultaneously engage to slow the tractor 102 and trailer 104.

In some tractor trailer systems, one or more brake pedals may be engaged by an operator to apply a tractor service brake. Brake actuators may be pressurized to apply the brakes, which will be described in greater detail below with reference to FIG. 2. Once the operator commands engagement of the tractor braking system, the trailer braking system also must engage to prevent the trailer from contacting or running into a back end of the tractor. In many conventional braking systems, there may be a single hydraulic line that connects between the tractor and trailer braking systems. In addition, a single hydraulic trailer brake valve may have a fixed gain associated with it due to its geometry. Thus, depending upon the fixed gain, an amount of pressure entering the valve if multiplied by the fixed gain to deliver a predetermined outlet pressure. As braking systems change and new federal and international guidelines or standards change, there is a need for both lower and higher outlet pressures depending upon the type of trailer. As a result, an adjustable gain across the hydraulic trailer brake valve is desirable over a fixed gain valve. Other needs and advantages will become apparent from the principles and teachings of the present disclosure.

Figure 2:
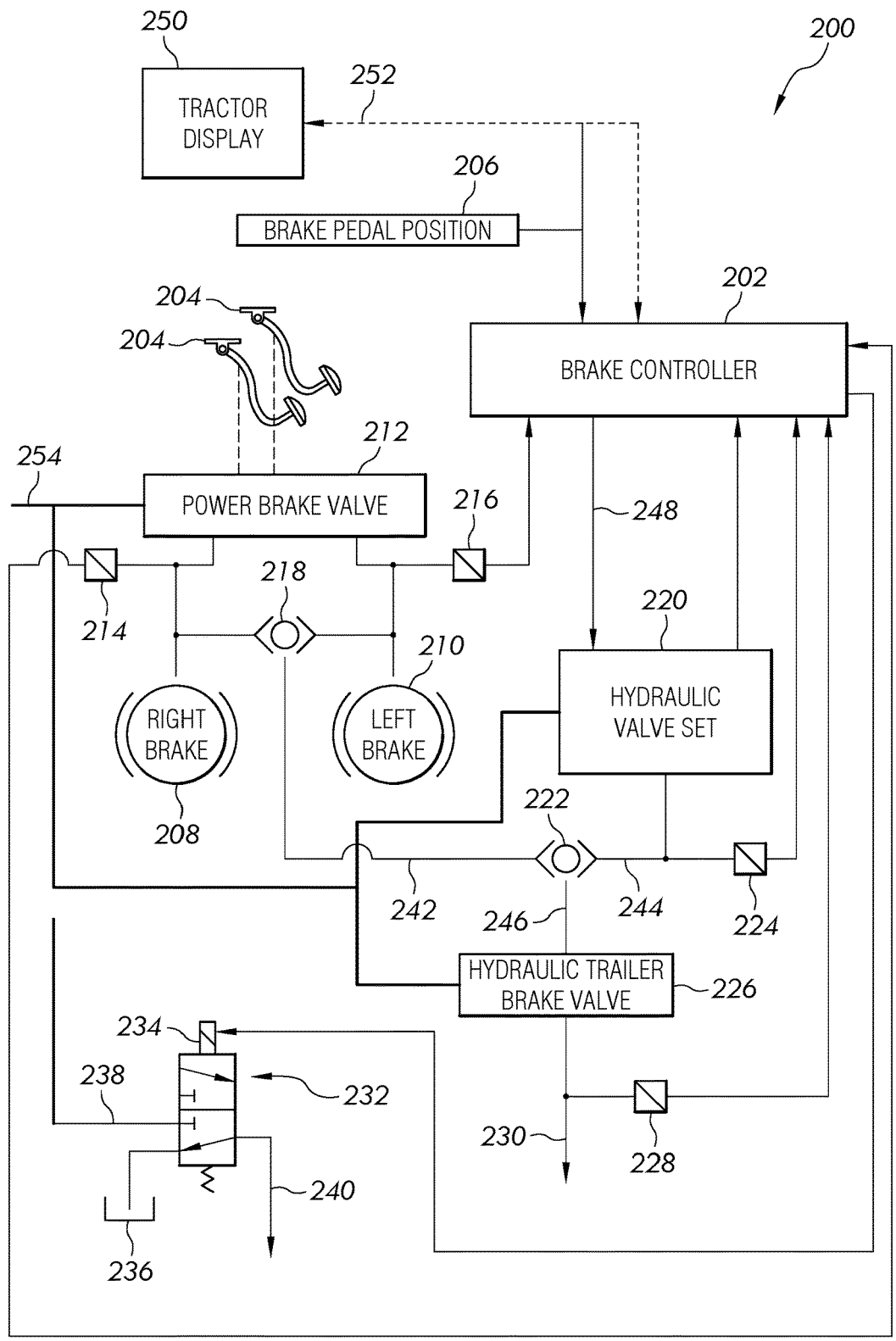
FIG. 2 is a control schematic view of a hydraulic system of a combined tractor and trailer brake system.

In some tractor trailer systems, the trailer braking system includes a hydraulic braking system, a pneumatic braking system, or a combination thereof. An example of a trailer brake system is shown in FIG. 2. In this embodiment, a hydraulic braking system 200 of a tractor and a trailer may include a brake controller 202 as shown. The brake controller 202 may be in electrical communication with a vehicle controller (not shown), an engine controller (not shown), a transmission controller (not shown), and any other type of controller for controlling the tractor or trailer. The brake controller 202 may include a plurality of inputs and outputs for receiving and communicating electrical signals or commands to different components within the braking system 200. In FIG. 2, for example, the brake controller 202 may be disposed in electrical communication with a tractor display 250. This communication may exist over a controller area network (CAN) bus 252 or communication link. The display 250 may allow an operator to selectively communicate instructions to the brake controller 202 for controlling the tractor braking system or the trailer braking system 200.

Other operator controls may also be in communication with the brake controller 202. For example, one or more brake pedals 204 may be selectively engaged by an operator. A brake position sensor 206 may detect a movement of the one or more brake pedals 204 and communicate this movement to the brake controller 202. Upon application of the one or more brake pedals 204, a brake valve 212 may be triggered such that fluid from a hydraulic supply line 254 (via a pump or other pressure source) is delivered to brake actuators. In turn, the brake actuators are controllably actuated to deliver hydraulic brake pressure to the tractor braking system to control the speed of the tractor. In FIG. 2, the braking system 200 illustrates a right brake actuator 208 and a left brake actuator 210. In this embodiment therefore the operator may depress a right brake pedal and a left brake pedal to engage the tractor braking system. The right brake pedal and right brake actuator 208 may control brake pressure to a service brake on the right, rear wheel of the tractor, and the left brake pedal and left brake actuator may control brake pressure to a service brake on the left, rear wheel of the tractor. In doing so, the right brake actuator 208 and left brake actuator 210 deliver hydraulic pressure to the tractor service brakes to slow the vehicle. This hydraulic pressure may also be delivered to the trailer braking system as will be described below.

As is known, an operator may apply the brake pedals to brake the tractor and slow its speed. In addition, an operator may gently apply or tap on the brake pedal, as is often the case with an operator desiring to disable cruise control in a motor vehicle. In the tractor trailer system, it may be desirable to begin braking the trailer as soon as the brake controller 202 detects engagement of the one or more brake pedals 204. In this example, the brake controller 202 may execute a pre-brake routine or algorithm to begin applying the trailer braking system. In the embodiment of FIG. 2, the brake pedal position sensor 206 can send a signal to the brake controller 202 indicating that the operator has begun to depress the pedals 204. Before any brake pressure or a substantial amount of brake pressure is generated, the brake controller 202 may execute the pre-brake routine and send a signal to the trailer braking system to begin braking the trailer. This signal may be an adjustable or proportional signal from the brake controller 202. The signal may be received by a trailer brake valve that includes a first solenoid valve and a second 2-way position valve (i.e., an on/off valve). In one example, up to seven bars of pressure may be output from the valve to the trailer brakes to begin a braking operation.

During this pre-brake routine, the first solenoid valve may receive the signal from the brake controller and deliver the hydraulic pressure to the trailer brakes. The second, 2-way position valve may be disposed in its open position to allow fluid pressure to pass through. However, if there is a failure detected in the system, the second, 2-way position valve can be actuated to its off or closed position to block fluid pressure to the trailer brake system. This "fail-silent" condition may be utilized to protect against possible failures in the system. In any event, hydraulic pressure may still pass through a main hydraulic trailer brake valve 226 (FIG. 2) so that the trailer braking system is engaged during a braking operation. The pre-brake valve set, however, may be disabled or closed so that no output pressure passes through the valve set to the trailer brakes.

In FIG. 2, hydraulic brake pressure from the right brake actuator 208 may be detected by a first pressure transducer 214, and from the left brake actuator 210 may be detected by a second pressure transducer 216. The first and second transducers may be in electrical communication with the brake controller 202. This electrical communication may be either wired or wireless communication, or any other known or to be developed form of communication. As a result, the brake controller 202 can monitor brake pressure from both actuators.

A shuttle valve 218 may be disposed in fluid communication with the right brake actuator 208 and the left brake actuator 210. The shuttle valve 218 may be actuated in either direction depending upon which brake pressure is the greatest. As such, the greater of the two brake pressures passes through the shuttle valve 218 and is referred to as brake pilot pressure. In FIG. 2, the brake pilot pressure flows downstream from the shuttle valve 218 along a brake pilot line 242.

The braking system 200 of FIG. 2 may also include a hydraulic valve set 220. This valve set 220 may be similar to the aforementioned pre-brake valve set in that it includes both a proportional solenoid valve and a 2-way shutoff valve. As shown, the brake controller 202 may be in electrical communication with the hydraulic valve set 220 to control its operation. For example, a trailer brake command 248 may be communicated from the brake controller 202 to the valve set 220. Moreover, the valve set 220 may send signals to the brake controller 202 in response to its operation (i.e., a pressure transducer 224 may communicate a pressure associated with the valve set to the controller 202).

Outlet pressure from the hydraulic valve set 220 may flow through a fluid line 244 as shown in FIG. 2. The hydraulic valve set fluid line 244 and the brake pilot line 242 may converge upon a second shuttle valve 222. Similar to the operation of the first shuttle valve 218, the greater of the brake pilot pressure and hydraulic valve set pressure may pass through the second shuttle valve 222 and enter hydraulic line 246. The pressure in hydraulic line 246 may be referred to as the hydraulic pilot pressure. A pressure transducer 228 can detect the hydraulic pilot pressure and communicate this pressure to the brake controller 202, as shown in FIG. 2. This hydraulic pilot pressure may pass through a hydraulic trailer brake control line 230 to the trailer brakes.

In the system 200 of FIG. 2, the trailer may also include a trailer park brake. The trailer park brake may be operably controlled via a hydraulic trailer park control valve 232. This valve 232 may include a solenoid 234 that is in electrical communication with the brake controller 202. The hydraulic trailer park control valve 232 may be biased to its vented position to allow pressure to flow through a supplementary hydraulic line 240. The valve 232 may also be in fluid communication with a tank or reservoir 236 as shown. As such, hydraulic pressure may be delivered from a supply line 238 to the hydraulic trailer park control valve 232, and in its normally or biased open position, pressure passes therethrough to the hydraulic trailer brake supplementary line 240.

Figure 3:
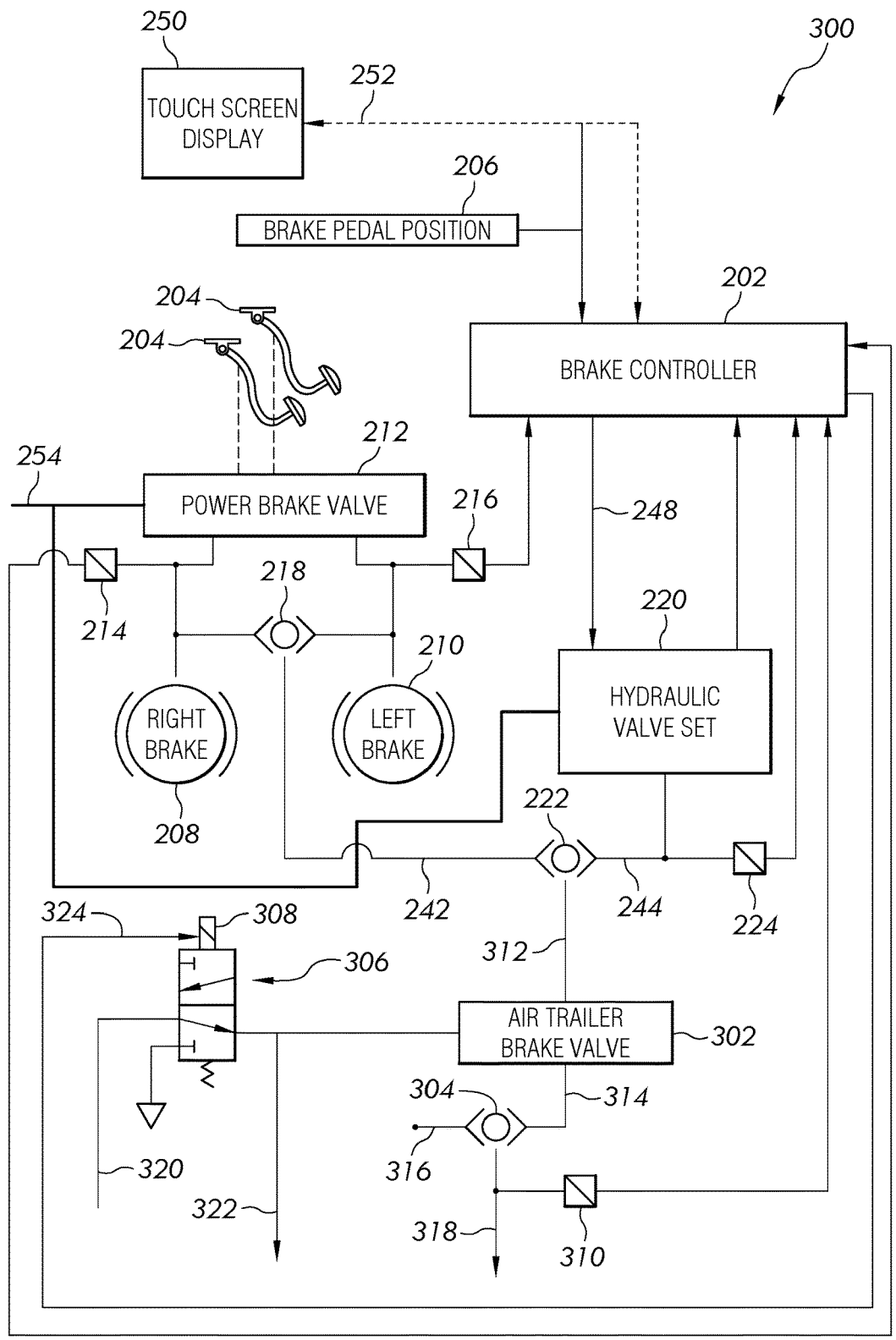
FIG. 3 is a control schematic view of a combined hydraulic and pneumatic system of a combined tractor and trailer brake system.

Referring to FIG. 3, a portion of the braking system 200 of FIG. 2 is removed and an air or pneumatic trailer braking system 300 is shown. As described above, the trailer braking system may be hydraulic, pneumatic, or a combination thereof. In this disclosure, the pneumatic trailer braking system may use any form of gas for controlling its brakes. However, for sake of simplicity, the type of gas will be referred to as air through the remainder of this disclosure. Thus, the pneumatic trailer braking system 300 will be referred to as the air trailer braking system 300, but it is to be understood that any type of gas may be used to control the trailer brakes.

In FIG. 3, the air trailer braking system 300 may include an air or pneumatic trail brake valve 302. The air trailer brake valve 302 may be located downstream from the second shuttle valve 222 of the hydraulic system 200 such that hydraulic pressure is used as an inlet to control the valve 302. Hydraulic pressure may flow through a pilot pressure line 312 to an inlet of the air trailer brake valve 302.

In addition to the air trailer brake valve 302, the air trailer braking system 300 may also include an air supply line 320, a shuttle valve 304, an air trailer park brake control valve (not shown), and a leak detect valve 306. The shuttle valve 304 is disposed downstream of the air trailer brake valve 302 and the air trailer park brake control valve. Thus, air pressure may be output from the air trailer brake valve 302 via a first pressure line 314 and from the air trailer park brake control valve via a second pressure line 316. The greater of the two pressures from the first and second line may trigger the shuttle valve 304 open so that air pressure can flow through a first air trailer brake control line 318 to the air trailer brakes. A pressure transducer 310 may be in fluid communication with the control line 318 to detect the pressure and communicate it to the brake controller 202.

The leak detect valve 306 may be in the form of a normally open solenoid control valve. The valve 306 may include a solenoid 308 that is disposed in electrical communication with the brake controller 202. As such, the brake controller 202 can control the leak detect valve 306 between its open and closed positions via a communication link 324 with the solenoid 308.

Air pressure may be supplied via the supply line 320 to the leak detect valve 306. Since the leak detect valve 306 may be biased to its open position, fluid may flow through the valve 306 to the air trailer brake valve 302 and to an air trailer brake supply line 322.

The embodiments of FIGS. 2 and 3 are illustrative of only one example of a braking system for a tractor trailer combination. Other embodiments of a braking system is possible and within the scope of this disclosure. For instance, another embodiment may include one or more electrohydraulic secondary brake valves.

Figure 4:
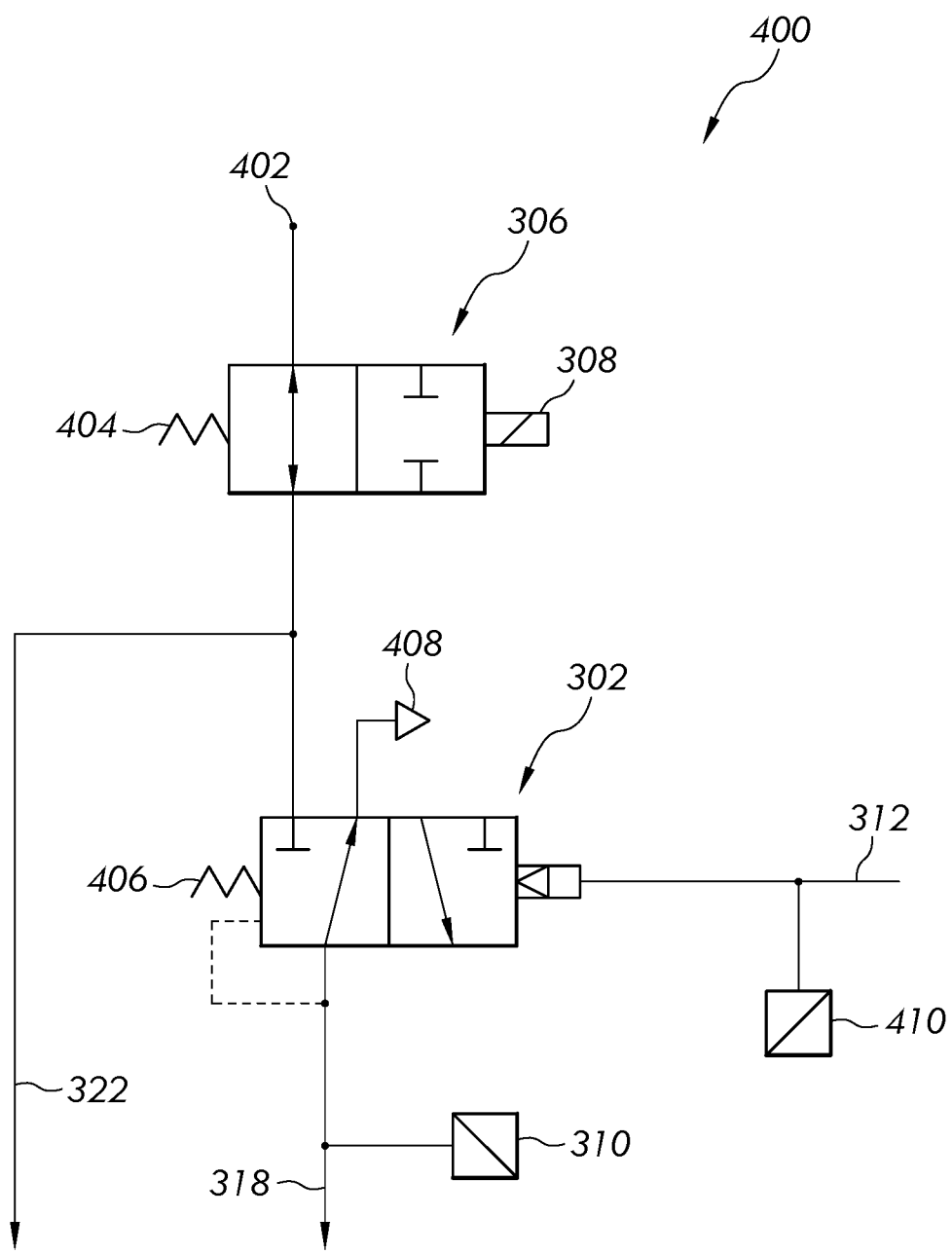
FIG. 4 is a pneumatic control circuit of a combined tractor and trailer brake system.

Referring to FIG. 4, an air trailer brake control system or circuit 400 is shown. As previously described, many non-agricultural trucks and machines utilize a mechanical breakaway valve as a breakaway detection feature. This is possible since these vehicles include a similar or same operating pressure for the air service brake and air trailer brake systems. With an agricultural machine such as a tractor, however, the work machine includes service brakes which are hydraulic. Hydraulic service brakes often require a much higher operating pressure than an air system, and the high pressure hydraulic brake system can make it difficult to utilize a mechanical breakaway valve solution. Thus, a system such as the one illustrated in FIG. 4 is necessary and utilizes an electro-pneumatic valve for breakaway control on agricultural work machines.

The control system 400 may include the air trailer brake valve 302 and the leak detect valve 306 as described above with reference to FIG. 3. Here, the leak detect valve 306 may be an electro-pneumatic valve that is disposed in series with the air trailer brake valve 302. The leak detect valve 306 may function as an on/off valve, where the valve is actuated between an energized or de-energized position. As shown, the valve 306 includes a solenoid 308 that is in electrical communication with the brake controller 202. Thus, the brake controller 202 can control the leak detect valve 306 between its energized and de-energized positions.

An air supply 402 is provided in fluid communication with an inlet side of the leak detect valve 306. Air may be supplied via an air supply line 320 as shown in FIG. 3. During normal operation, the leak detect valve 306 may be de-energized and air flow is possible from the supply 402 to the second control line 322 and the air trailer brake valve 302. In this position, a spring 404 may bias the leak detect valve 306 to an open position to allow the air supply 402 to be fluidly coupled with the second control line 322 and air trailer brake valve 302. The second control line 322 may be fluidly coupled to a park brake of the trailer such that when air flows through the second control line 322, the park brake is held or disposed in its disengaged position. When there is no air flow through the second control line 322, the park brake may be released to slow or stop the machine.

The brake controller 202 is configured to detect if there is a leak or a break in the first control line 318 of FIG. 3. When a leak is detected, the controller 202 may send a signal (e.g., a current) to the solenoid 308 to energize the leak detect valve 306. Once energized, the leak control valve 306 may actuate to a closed position to block air flow from the supply 402 to the second control line 322 and the air trailer brake valve 302. With no air flow provided to the second control line 322, the park brake (not shown) may be released to slow the trailer. Moreover, without air flow, the air trailer brake valve 302 may not provide any flow to the first control line 318. The air trailer brake valve 302 may include a spring 406 that biases it to a position. Air or hydraulic fluid may vent 408 to tank 236 or another location.

Figure 5:
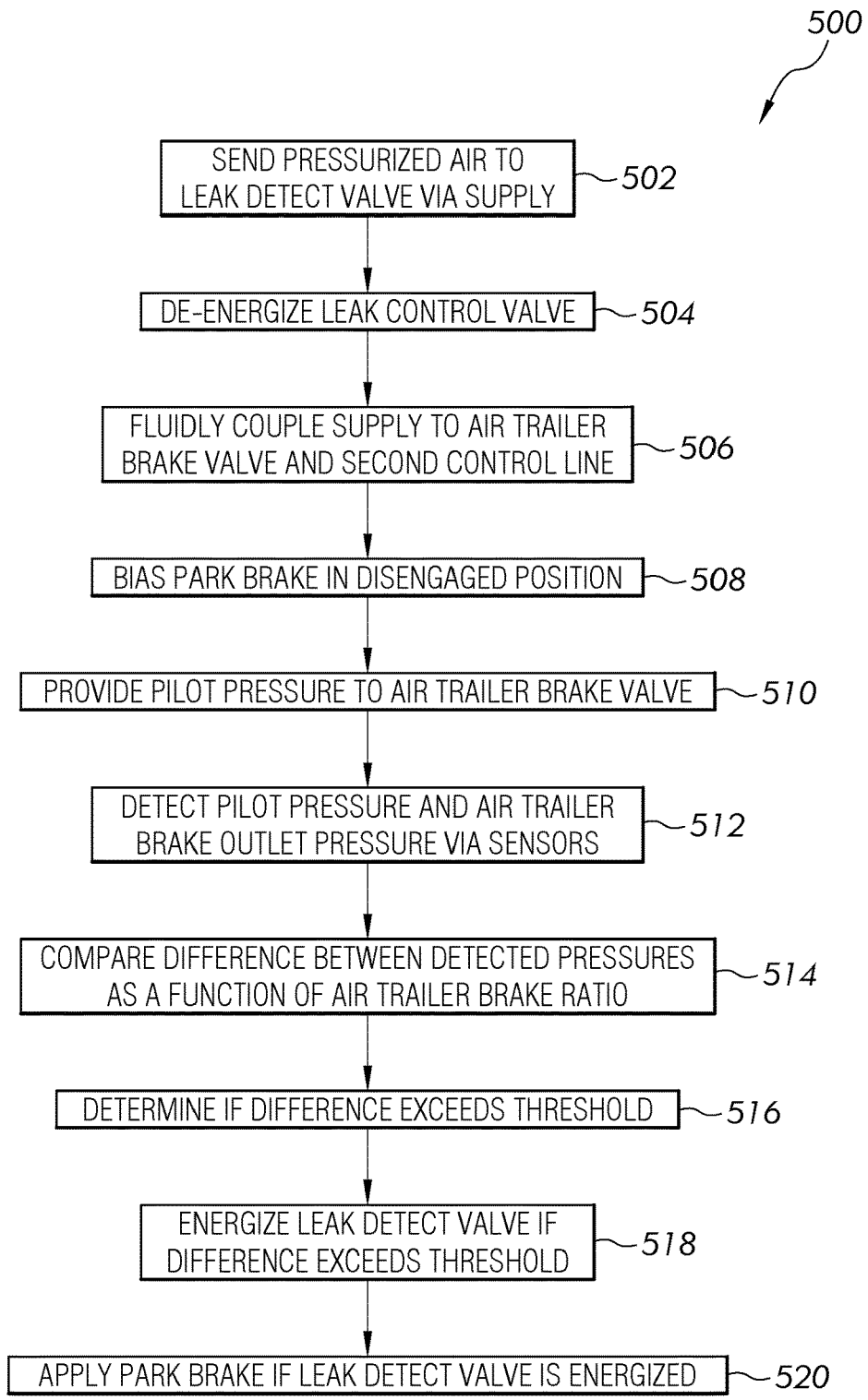
FIG. 5 is a flow diagram of a control process for controlling a combined tractor and trailer brake system.

Referring to FIG. 5, a control process 500 is provided for controlling the system 400 of FIG. 4 when a leak is detected. The process 500 may include one or more blocks or steps which are executed during the process 500. In a first block 502, for example, the air supply 402 provides pressurized air to an inlet side of the leak detect valve 306. This block may be executed regardless of whether a leak is detected. When there is no leak, block 504 is executed and the leak detect valve 306 is de-energized. In this condition, the spring 404 biases the valve open so that air is able to flow therethrough. When air is able to flow through the leak detect valve 306, blocks 506 and 508 are executable such that the air supply 402 is fluidly coupled to the second control line 322 and the air trailer brake valve 302. In particular, the air supply 402 is able to provide pressurized air to an air inlet side of the air trailer brake valve 302. Moreover, as air flows through the second control line 322, the park brake (not shown) of the trailer is biased or held in its disengaged position.

Since the service brakes on an agricultural work machine are hydraulic, block 510 is executable such that hydraulic pressure may be provided via the pilot pressure line 312 to a hydraulic inlet side of the air trailer brake valve 302. Pilot pressure may be detected by a pressure sensor or transducer 410 at a location along the pilot pressure line 312. Moreover, in block 512, the outlet air pressure from the air trailer brake valve 302 may also be detected by a second pressure sensor or transducer 310. The pressures on both sides of the air trailer brake valve 302 may therefore be used to detect a possible leak in the first control line 318.

In order to detect a leak, the pilot pressure and outlet pressure may be communicated to the brake controller 202 via the respective sensor. In block 514, the brake controller 202 may determine or receive an air trailer brake ratio that exists across the valve 302. This ratio may be associated with an output gain across the valve. This may be a fixed ratio that is predefined and stored in a memory unit of the controller 202. Alternatively, the ratio may be determined by a calculation made by the controller 202. In any event, the brake controller 202 determines the air trailer brake ratio and multiplies it by the pilot pressure detected by the first pressure sensor 410. The result of this calculation is then compared to the output pressure detected by the second pressure sensor 310. From this calculation, a difference is determined in block 514, and it is compared to a broken line threshold value in block 516. The broken line threshold value may be stored in the controller 202, i.e., in its memory unit. If the difference exceeds the threshold value in block 516, then the controller 202 may make a determination that a leak exists in the first control line 318.

If, in block 516, the brake controller 202 determines that a leak exists in the second control line 318, then the process 500 may advance to block 518 where the controller 202 sends a signal to the solenoid 308 to energize the leak detect valve 306. This signal or command may be a current, for example. By energizing the leak detect valve 306 in block 518, the leak detect valve 306 may actuate to its closed position to block air flow to the second control line 322. As air flow is blocked by the leak detect valve 306, the park brake (not shown) may be released in block 520 to slow or stop the trailer. Moreover, air flow is blocked from the air trailer brake valve 302, and the air leak in the first control line 318 is stopped.

The control process 500 of FIG. 5 may be executed continuously. However, leak detection is only executed when there is pilot pressure provided to the air trailer brake valve 302. Otherwise, the control system 400 is not actively trying to brake the trailer.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of detecting a leak in an air trailer brake circuit of a trailer, comprising:
   providing a controller, a base valve, a first sensor, a second sensor, a leak control valve having a solenoid, a pneumatic fluid supply, a first brake output, and a second brake output;
   supplying a first pressure to an inlet of the base valve, where the first pressure is a hydraulic pressure;
   outputting a second pressure from an outlet of the base valve, where the second pressure is a pneumatic pressure;
   detecting the first pressure with the first sensor and the second pressure with the second sensor;
   communicating the detected first pressure and the second pressure to the controller;
   comparing a difference between first pressure and the second pressure to a threshold; and
   detecting a leak in the air trailer brake circuit if the difference satisfies the threshold.

2. The method of claim 1, further comprising energizing the solenoid of the leak control valve via the controller if the difference satisfies the threshold.

3. The method of claim 1, further comprising actuating the leak control valve to a closed position if the difference satisfies the threshold.

4. The method of claim 1, further comprising supplying pressurized fluid from the pneumatic fluid supply to the leak control valve.

5. The method of claim 1, further comprising supplying a third pressure to a second inlet of the base valve from the pneumatic fluid supply, where the third pressure is a pneumatic pressure.

6. The method of claim 1, further comprising determining the difference by first multiplying the first pressure by a ratio, and then subtracting the second pressure therefrom.

7. The method of claim 1, further comprising de-energizing the solenoid if the difference does not satisfy the threshold.

8. The method of claim 7, further comprising fluidly coupling the pneumatic fluid supply to the first and second brake outlet if the leak detect valve is de-energized.

9. The method of claim 1, further comprising blocking pneumatic fluid from the first and second brake outlets when the difference satisfies the threshold.

10. The method of claim 1, further comprising applying a park brake of the trailer if the difference satisfies the threshold.

11. The method of claim 1, further comprising disengaging a park brake of the trailer if the difference does not satisfy the threshold.

12. The method of claim 1, further comprising fluidly coupling the leak control valve and the base valve in series when the difference does not satisfy the threshold.

13. The method of claim 1, further comprising:
   fluidly coupling the pneumatic fluid supply to the first brake output via the leak control valve; and
   fluidly coupling the pneumatic fluid supply to the second brake output via the leak control valve and the base valve.

14. The method of claim 1, further comprising stopping the detected leak between the base valve and the second brake output by energizing the solenoid of the leak control valve.

15. A braking system of a trailer, comprising:
   a pressurized supply of pneumatic fluid and hydraulic fluid;
   a base valve including an inlet and an outlet, where the inlet is fluidly coupled to the pressurized supply of hydraulic fluid;
   a solenoid control valve including an inlet fluidly coupled to the pressurized supply of pneumatic fluid, the solenoid control valve operably controlled between an energized state and a de-energized state;
   a brake output fluidly coupled to the outlet of the base valve;
   a first sensor and a second sensor fluidly coupled to the base valve, the first sensor configured to detect a first pressure at the inlet of the base valve, and the second sensor configured to detect a second pressure at the outlet of the base valve;
   wherein, the solenoid valve is operably controlled to its energized state when a difference between the first pressure and second pressure satisfies a threshold.

16. The braking system of claim 15, wherein in the de-energized state the pressurized supply is fluidly coupled to the base valve and the brake output, and in the energized state the solenoid control valve fluidly de-couples the pressurized supply from the base valve and the brake output.

17. The braking system of claim 15, further comprising a second brake output fluidly coupled to the solenoid control valve in the de-energized state.

18. The braking system of claim 17, further comprising a park brake pneumatically controlled by the second brake output between a disengaged position and an engaged position, wherein in the de-energized state the park brake is in its disengaged position, and in the energized state the park brake is in its engaged position.

19. The braking system of claim 15, further comprising a controller disposed in electrical communication with the first sensor, the second sensor, and the solenoid, the controller storing the threshold and a ratio, where the ratio is a function of the base valve;

wherein, the controller determines the difference by multiplying the first pressure by the ratio and then subtracting the second pressure therefrom;

wherein, the controller compares the difference to the threshold, and sends an electrical signal to the solenoid to control the solenoid valve between its energized and de-energized states.

20. A pneumatic braking system of a trailer towed by a work machine, comprising:

a pressurized supply providing pneumatic fluid;

a pilot line providing hydraulic fluid;

a base valve including a first inlet, a second inlet, and an outlet, where the first inlet is fluidly coupled to the pilot line;

a solenoid control valve including an inlet and an outlet, the inlet of the solenoid control valve fluidly coupled to the pressurized fluid supply, and the outlet being coupled to the second inlet of the base valve;

a first control line fluidly coupled to the outlet of the base valve;

a second control line fluidly coupled to the outlet of the solenoid control valve;

wherein, the solenoid control valve is operably controlled between an energized state and a de-energized state;

wherein, in the de-energized state the pressurized supply is fluidly coupled to the second inlet of the base valve and the second control line, and in the energized state the solenoid control valve fluidly de-couples the pressurized supply from the second inlet of the base valve and the second control line.

* * * * *